(12) United States Patent
Aoki

(10) Patent No.: US 6,265,836 B1
(45) Date of Patent: Jul. 24, 2001

(54) IMAGE DISTORTION COMPENSATING APPARATUS

(75) Inventor: Kyousuke Aoki, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/265,859

(22) Filed: Mar. 11, 1999

(30) Foreign Application Priority Data

Mar. 13, 1998 (JP) .................................................. 10-063276

(51) Int. Cl.⁷ ...................................................... G09G 1/04
(52) U.S. Cl. .......................................... 315/370; 315/364
(58) Field of Search ........................ 315/368.26, 368.28, 315/370, 371, 383, 364; G09G 1/04

(56) References Cited

U.S. PATENT DOCUMENTS 4,827,193 * 5/1989 Watanuki et al. ................... 315/371
4,916,365 * 4/1990 Arai ..................................... 315/383
5,804,928 * 9/1998 Endo .................................... 315/371

FOREIGN PATENT DOCUMENTS 5-3189    1/1993 (JP).
9-149283  6/1997 (JP).

* cited by examiner

Primary Examiner—Don Wong
Assistant Examiner—Hoang Nguyen
(74) Attorney, Agent, or Firm—Ronald P. Kananen; Rader, Fishman & Grauer

(57) ABSTRACT

The invention provides a center pincushion distortion compensating reactor with a simplified construction including two horizontal compensation coils, one vertical compensating coil, and a magnet for generating a bias magnetic field. A horizontal deflection current is passed through the two horizontal compensation coils, and the vertical compensation coil is modulated with the period of a vertical deflection current such that a magnetic field is generated in a direction opposite to the bias magnetic field thereby changing the impedance of the horizontal compensation coils so as to compensate for a center pincushion distortion on the left and right sides of a screen.

4 Claims, 4 Drawing Sheets

IMAGE DISTORTION COMPENSATING APPARATUS

BACKGROUND OF THE INVENTION

1. Field of the Invention

The present invention relates to an image distortion compensating apparatus for compensating for an image distortion of a CRT (cathode ray tube) used in a television receiver or a display monitor, and more particularly to an image distortion compensating apparatus with a simple construction for compensating for a center pincushion distortion on left and right sides of a screen.

2. Description of the Related Art

When an image is formed on the front screen of a CRT of a television receiver by means of deflection of an electron beam, the image includes a pincushion distortion.

The pincushion distortion refers to a horizontal line distortion in a vertical direction or a vertical line distortion. Various methods and apparatuses for compensating for such distortions have been proposed.

However, even after compensating for such distortions, there can still be a residual center pincushion distortion (i.e., an "inner vertical-line pincushion distortion") on the front screen.

FIG. 1 is a front view of a front screen, which schematically illustrates a center pincushion distortion and the principle of compensating for such a distortion. In FIG. 1, O denotes the vertical center line of the screen.

In the CRT, if distortion is compensated for such that good linearity is obtained at the left and right ends of the screen, there can be a large residual nonlinear distortion near the center line O as represented by solid lines in FIG. 1.

A pincushion distortion compensating circuit for compensating for such a center pincushion distortion has been proposed (disclosed for example in Japanese Examined Patent Publication No. 5-3189).

This distortion compensating circuit is constructed as follows. That is, in a horizontal deflection circuit, which includes a horizontal deflection coil and a sigmoid distortion compensation capacitor and which is driven by a power supply modulated by a vertical synchronization parabolic-wave, a secondary winding of a voltage-current conversion transformer is connected between the horizontal deflection coil and the sigmoid distortion compensation capacitor and a voltage having a maximum value at the center of the vertical synchronization period is applied to the primary winding of the above-described transformer.

In recent years, as the front screen of CRTs becomes increasingly flat, the deflection angle tends to become greater.

Because upper and lower areas of the screen of the CRT are more distant from the deflection center than a central area of the screen, the upper and lower areas need a lesser amount of compensation for the sigmoid distortion than the central area.

Therefore, if the sigmoid distortion is compensated for using a conventional sigmoid distortion compensating circuit, the sigmoid distortion is overcompensated in the upper and lower areas compared to the central area.

This makes it difficult to completely compensate for the pincushion distortion represented by the solid lines in FIG. 1 and it becomes necessary to compensate for the sigmoid distortion to a greater degree. The difference in distance with respect to the deflection center between the upper/lower areas and the central area of the screen becomes greater and thus a greater distortion occurs.

To solve the above problem, an apparatus for compensating for the inner vertical-line pincushion distortion has been proposed (disclosed for example in Japanese Unexamined Patent Publication No. 9-149283).

In this image distortion compensating apparatus, the amount of sigmoid distortion compensation in the horizontal deflection is varied depending on the amount of vertical deflection by controlling the inductance of a saturable reactor, through which the horizontal deflection current is passed, depending on the vertical deflection current.

This image distortion compensating apparatus uses a saturable reactor including four reactor coils connected to each other in a series fashion and also connected in series to the horizontal deflection coil so that the horizontal deflection coil is passed through the four reactor coils, a magnet (i.e., a permanent magnet) around which the four reactor coils are wound such that magnetic biases are applied in opposite directions to two respective ends of the set of four reactor coils, and another coil which is connected in series to the vertical deflection coil so that the vertical deflection current is passed through this coil thereby controlling the inductance of the four reactor coils.

In. CRTs, as described above, it is required to prevent image quality degradation caused by center pincushion distortion (inner vertical-line pincushion distortion) which can occur on the left and right sides of the screen, and various techniques of compensating for such a distortion are proposed.

However, in the distortion compensating apparatus disclosed in Japanese Unexamined Patent Publication No. 9-149283, the saturable reactor needs four reactor coils (i.e., horizontal compensation coils).

Furthermore, the magnet for producing bias magnetic fields in opposite directions can cause a leakage magnetic field, and thus landing has to be taken into account.

Thus, it is an object of the present invention to provide a small-sized image distortion compensating apparatus with a simplified construction including a lesser number of horizontal compensation coils and requiring no particular consideration on the landing effects, capable of being produced at less cost.

SUMMARY OF THE INVENTION

According to an aspect of the invention, to achieve the above object, there is provided an image distortion compensating apparatus including a center pincushion distortion compensating reactor, wherein the center pincushion distortion compensating reactor includes:

two horizontal compensation coils connected to each other in series; one vertical compensation coil; and a pair of magnets for applying a bias magnetic field to the horizontal compensation coils and the vertical compensation coil.

A horizontal deflection current is passed through the two horizontal compensation coils and the vertical compensation coil is modulated with the period of the vertical deflection current such that a magnetic field is generated in a direction opposite to the bias magnetic field thereby changing the impedance of the horizontal compensation coils so as to compensate for the center pincushion distortion on the left and right sides of the screen.

DESCRIPTION OF THE PREFERRED EMBODIMENTS

In the present invention, a center pincushion distortion compensating reactor is formed into a simplified construction including two horizontal compensation coils, one vertical compensation coil, and a magnet for applying a bias magnetic field to the horizontal and vertical compensation coils. A horizontal deflection current is passed through the two horizontal compensation coils being applied with the above-described bias magnetic field. Furthermore, the vertical compensation coil is modulated with the period of the vertical deflection current such that a magnetic field is generated in a direction opposite to the bias magnetic field thereby changing the impedance of the horizontal compensation coils so as to compensate for the center pincushion distortion on the left and right sides of the screen.

Figure 2:
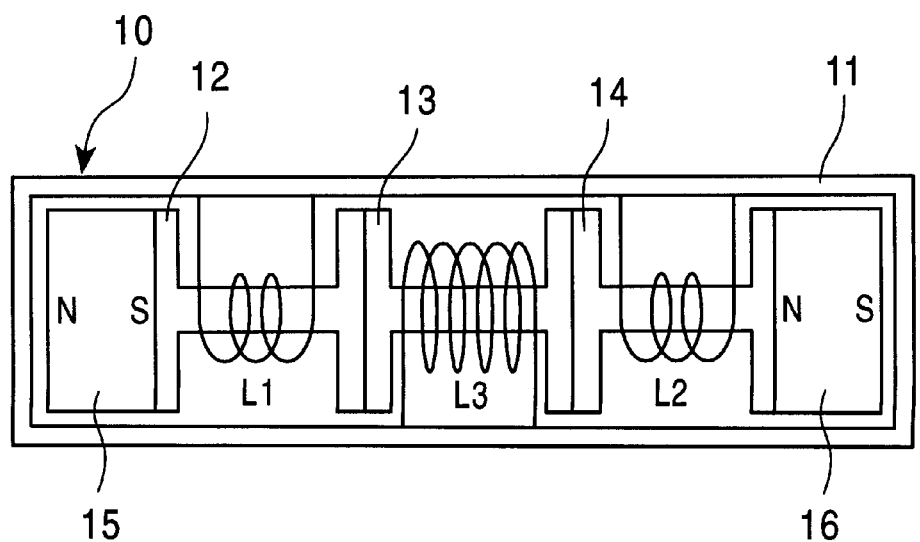
FIG. 2 is a side view of a center pincushion distortion compensating reactor for use in an image distortion compensating apparatus according to the present invention.

FIG. 2 is a side view illustrating an example of a construction of the center pincushion distortion compensating reactor suitable for use in the image distortion compensating apparatus according to the invention, wherein only main parts are shown in the figure. In FIG. 2, the center pincushion distortion compensating reactor 10 includes a case 11, cores 12–14, magnets 15 and 16, a first horizontal compensation coil L1, a second horizontal compensation coil L2, and a vertical compensation coil L3.

That is, the center pincushion distortion compensating reactor 10 includes three compensation coils: the first horizontal compensation coil L1 wound around the core 12, the second horizontal compensation coil L2 wound around the core 14, and the vertical compensation coil L3 wound around the core 13, as shown in FIG. 2.

A pair of magnets 15 and 16 is disposed such that one magnet is located at one end of the set of three cores 12–14 and the other magnet is located at the other end and such that one end has a south pole and the other end has a north pole.

The two horizontal compensation coils L1 and L2 are wound in directions such that the directions of magnetic fields generated by these coils L1 and L2 become opposite to each other.

The vertical compensation coil L3 is wound in a direction such that the vertical compensation coil L3 generates a magnetic field in a direction opposite to the direction of the magnetic field (bias magnetic field) generated by the pair of magnets 15 and 16.

In the image distortion compensating apparatus according to the present invention, the pincushion distortion on the left and right sides of the screen is compensated for using the above-described center pincushion compensating reactor 10.

The circuit configuration of the image distortion compensating apparatus is described below.

Figure 3:
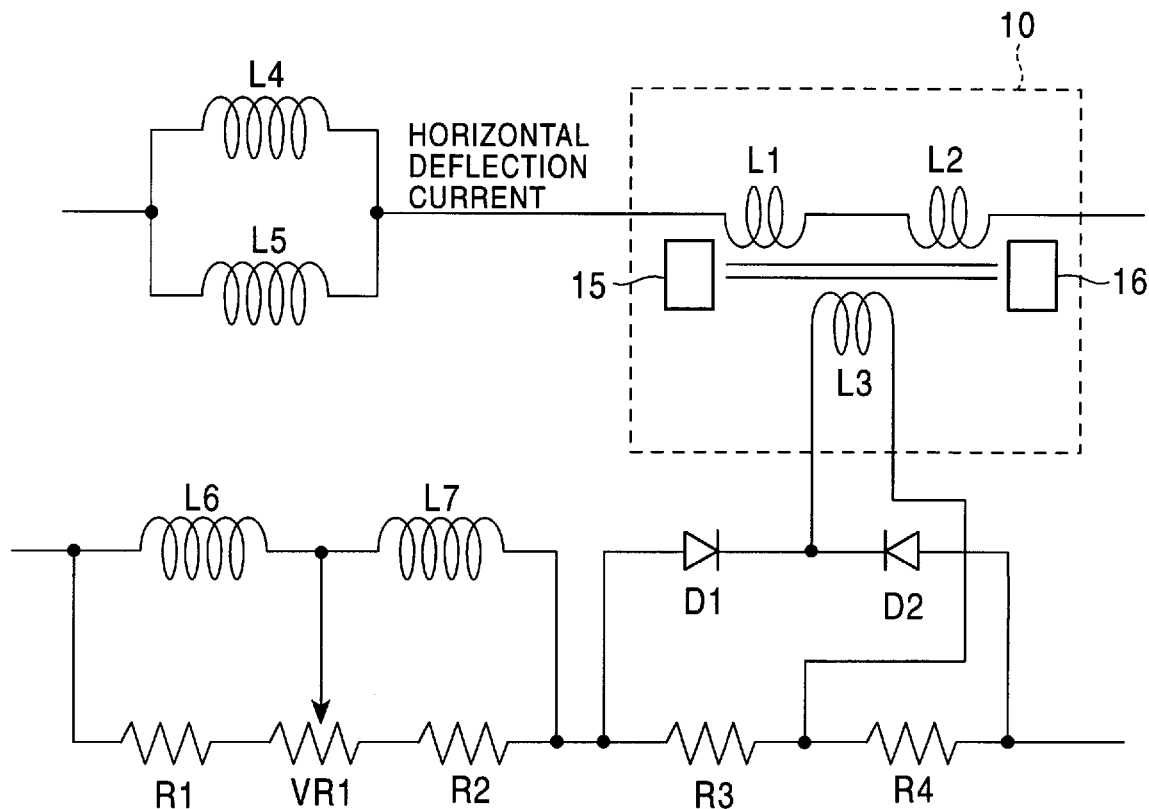
FIG. 3 is a circuit diagram of an image distortion compensating apparatus according to the present invention.

FIG. 3 is a circuit diagram of the image distortion compensating apparatus according to an embodiment of the invention. In FIG. 3, similar parts to those in FIG. 2 are denoted by similar reference symbols or numerals. In addition to those similar parts, the image distortion compensating apparatus further includes horizontal deflection coils L4 and L5, vertical deflection coils L6 and L7, resistors R1–R4, a variable resistor VR1, and diodes D1 and D2.

In FIG. 3, the center pincushion distortion compensating reactor 10 is shown in the form of an equivalent circuit whereas it has the physical structure described above with reference to FIG. 2.

In FIG. 3, the horizontal deflection coils L4 and L5 and the vertical deflection coils L6 and L7 are provided in the form of coils on a deflection yoke. A sawtooth current with a horizontal period is supplied to the horizontal deflection coils L4 and L5 from a horizontal deflection circuit (not shown) and a sawtooth current with a vertical period is supplied to the vertical deflection coils L6 and L7 from a vertical deflection circuit, thereby deflecting the electron beam.

Although in the following description the deflection is assumed to be made to the right, the image distortion compensating apparatus also operates in a basically similar manner when the deflection is made to the left.

In the case of the deflection to the right, one of the horizontal compensation coil, for example the first horizontal compensation coil L1, generates a magnetic field in a direction opposite to the direction of the magnetic field (bias magnetic field) generated by the two magnets 15 and 16. The other horizontal compensation coil, that is, the second horizontal compensation coil L2, generates a magnetic field in the same direction as the direction of the magnetic field (bias magnetic field) generated by the two magnets 15 and 16.

In the following discussion, the operation is described for particular points on the screen of the CRT.

Figure 4:
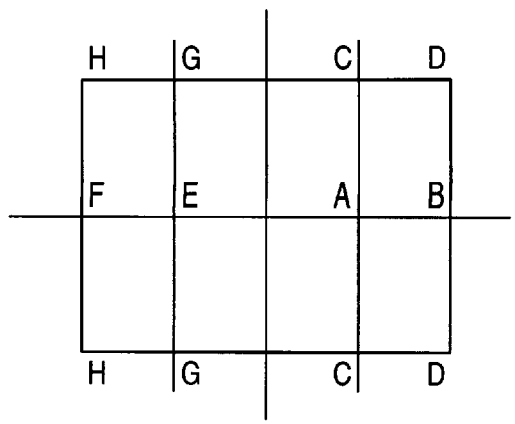
FIG. 4 is a front view of the front screen, provided for schematically illustrating various image points on the screen.

FIG. 4 is a front view of the front screen, wherein the figure is provided to schematically illustrate the center pincushion distortion and the principle of compensating for such a distortion. In FIG. 4, A, B, E, and F denote points lying on a horizontal line, and C, D, G, and H denote points lying on an upper or lower horizontal line wherein the locations of points C, D, G, and H correspond to the locations of points A, B, E, and F, respectively.

In FIG. 4, the center pincushion distortion described above becomes great in particular at points A and E on the screen. These points A and E are located in a central part between the left and right ends B and F in the horizontal direction, and thus these points A and E are called central-area points.

Figure 1:
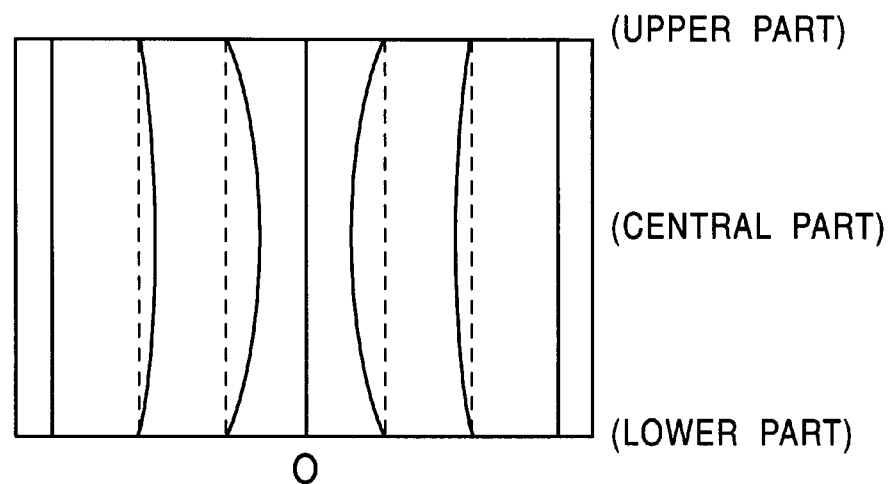
FIG. 1 is a front view of a front screen, provided for schematically illustrating a center pincushion distortion and the principle of compensating for such a distortion.

In the case of the deflection to the right, if a center pincushion distortion occurs, point A (a central-area point) shown in FIG. 4 is more shifted toward the center of the screen than corresponding points C at an upper or lower location, as shown in Fig. 1.

In the case of the deflection to the left, a center pincushion distortion occurs in a fashion symmetric about the vertical line passing through the center of the screen.

The change in the inductance of the coils depending on the location on the screen is described below for particular points A–G defined in FIG. 4.

The first horizontal compensation coil L1 shown in FIG. 3 generates a magnetic field in the direction opposite to the direction of the magnetic field (bias magnetic field) generated by the two magnets 15 and 16.

Figure 5:
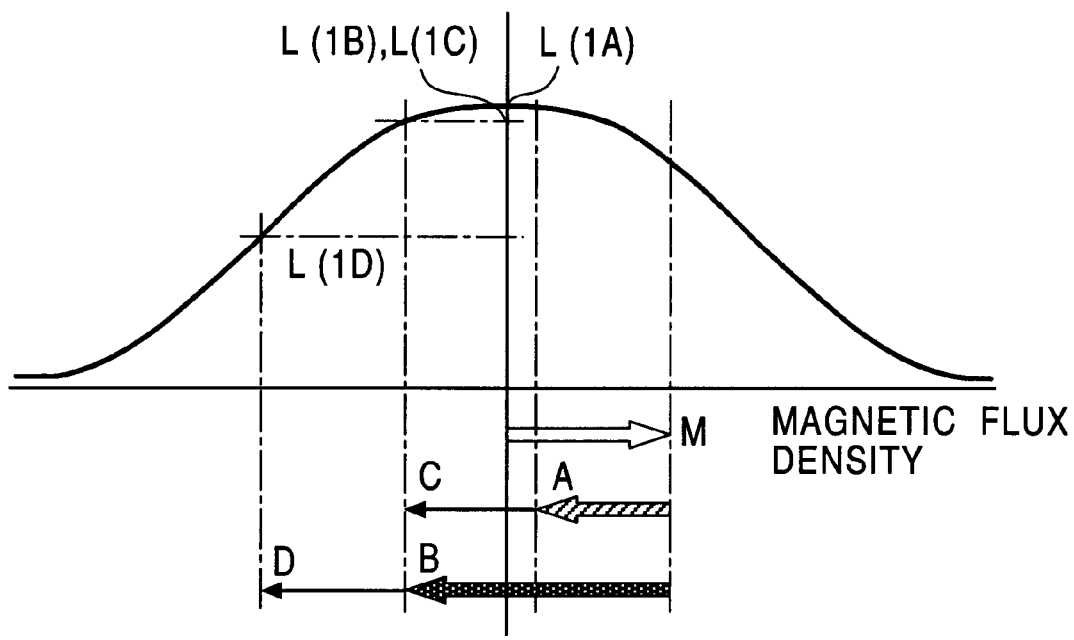
FIG. 5 is a graph illustrating an example of the dependence of the inductance of a first horizontal compensation coil L1 on the magnetic flux density.

When deflection is made to the right, the inductance of the first horizontal compensation coil L1 varies depending on the magnetic flux density and thus the inductance becomes such as shown in FIG. 5, at points A, B, C, and D, respectively, shown in FIG. 4.

FIG. 5 illustrates an example of the dependence of the inductance of the first horizontal compensation coil L1 on the magnetic flux density. In this figure, the horizontal axis represents the location corresponding to the magnetic flux density and the vertical axis represents the inductance.

On the other hand, the second horizontal compensation coil L2 generates a magnetic field in the same direction as the direction of the magnetic field generated by the two magnets 15 and 16.

Figure 6:
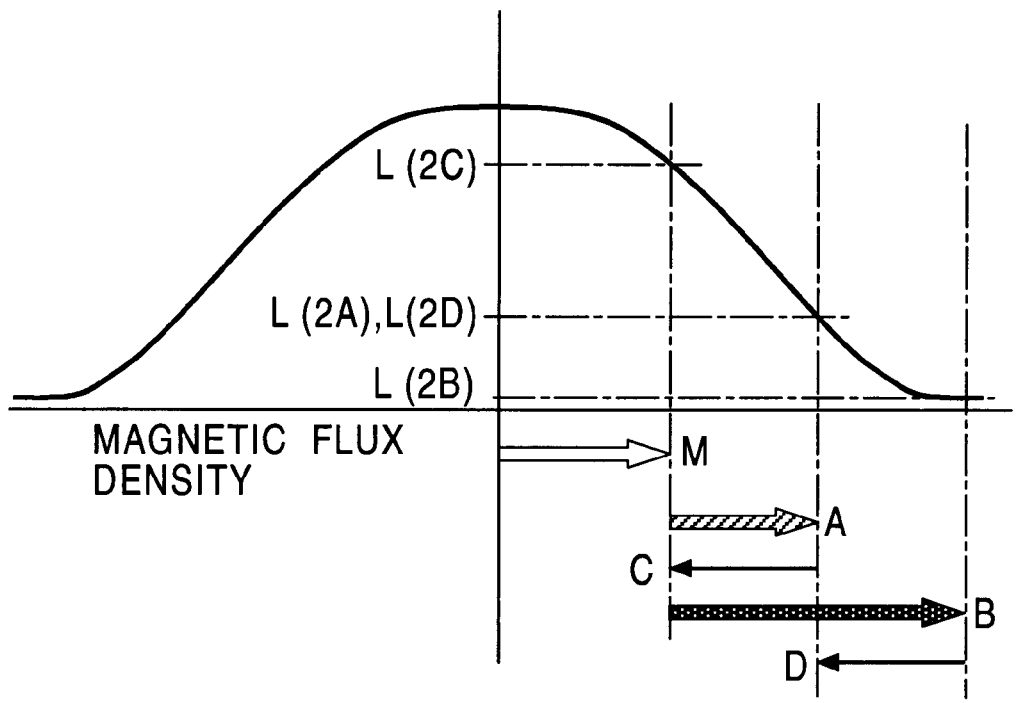
FIG. 6 is a graph illustrating an example of the dependence of the inductance of a second horizontal compensation coil L2 on the magnetic flux density.

When deflection is made to the right, the inductance of the second horizontal compensation coil L2 also varies depending on the magnetic flux density and thus the inductance becomes such as shown in FIG. 6 at respective points A, B, C, and D shown in FIG. 4.

FIG. 6 illustrates an example of the dependence of the inductance of the second horizontal compensation coil L2 on the magnetic flux density.

In FIGS. 5 and 6, an open arrow M represents the density of the bias magnetic flux generated by the pair of magnets 15 and 16, a diagonally shaded arrow A represents the density of the magnetic flux, at point A (central-area point), generated by the horizontal compensation coils L1 and L2, a crosshatched arrow B represents the density of the magnetic flux, at point B (at the right end), generated by the horizontal compensation coils L1 and L2, and solid arrows C and D represent the density of the magnetic flux, at points C and D at the top and bottom of the screen, generated by the vertical compensation coil L3.

Furthermore, $L(1A)$–$L(1D)$ denote the inductance of the first horizontal compensation coil L1 at respective points A–D and $L(2A)$–$L(2D)$ denote the inductance of the second horizontal compensation coil L2 at respective points A–D.

As shown in FIG. 3, the first horizontal compensation coil L1 and the second horizontal compensation coil L2 are connected to each other in series wherein the coils L1 and L2 are wound in opposite directions such that they generate magnetic fields in directions opposite to each other. A horizontal deflection current is applied from the horizontal deflection circuit to the first horizontal compensation coil L1 and the second horizontal compensation coil L2.

The sawtooth current applied to the vertical deflection coils L6 and L7 is rectified by the diodes D1 and D2 and the rectified current is passed through the vertical compensation coil L3. As a result, the vertical compensation coil L3 generates a magnetic field, modulated with the period of the vertical deflection current, in a direction opposite to the bias magnetic field.

As a result, the inductance varies depending on the location (points A–D) in FIG. 4.

Referring to FIG. 5, the change in the inductance of the first horizontal coil L1 at the central-area point A and also at points C located above and below point A is discussed below.

The first horizontal compensation coil L1 generates a magnetic field in the direction opposite to the direction of the magnetic field generated, as the bias magnetic field, by the pair of magnets 15 and 16.

Therefore, as shown in FIG. 5, the inductance $L(1A)$ at point A in the central area of the screen is determined by the magnetic flux density given by the difference between the open arrow M (density of the bias magnetic flux generated by the pair of magnets 15 and 16) and the diagonally shaded arrow A (density of the magnetic flux generated, at point A, by the horizontal compensation coil L1). That is, the inductance $L(1A)$ corresponds to the head of the shaded arrow A in FIG. 5. This inductance $L(1A)$ is approximately equal to the maximum inductance as shown in FIG. 5.

The inductance $L(1C)$ at points C on the screen corresponds to the head of the solid arrow C, that is, the point obtained by shifting the point indicated by the diagonally shaded arrow A to the left by an amount equal to the length of the solid arrow C (density of the magnetic flux generated, at the top and bottom points C on the screen, by the vertical compensation coil L3). The inductance $L(1C)$ (represented by the vertical axis) at points C is nearly equal to the inductance $L(1A)$ at point A.

That is, $$L(1A) \approx L(1C)$$

Referring now to FIG. 6, the change in the inductance of the second horizontal coil L2 at the central-area point A and also at points C located above and below point A is discussed below.

The second horizontal compensation coil L2 generates a magnetic field in the same direction as the direction of the magnetic field generated by the pair of magnets 15 and 16.

Therefore, in the case of the second horizontal compensation coil L2, the inductance $L(2A)$ at point A is determined by the magnetic flux density given by the sum of the open arrow M (density of the bias magnetic flux generated by the pair of magnets 15 and 16) and the diagonally shaded arrow A (density of the magnetic flux generated, at point A, by the horizontal compensation coil L2), as shown n FIG. 6. That is, the inductance $L(2A)$ corresponds to the head of the shaded arrow A in FIG. 6.

On the other hand, the inductance $L(2C)$ at points C on the screen corresponds to the head of the solid arrow C, that is, the point obtained by shifting the point indicated by the diagonally shaded arrow A to the left by an amount equal to the length of the solid arrow C (density of the magnetic flux generated, at the top and bottom points C on the screen, by the vertical compensation coil L3).

As a result, the inductance $L(2C)$ at points C becomes greater than the inductance $L(2A)$ at point A. That is, $L(2A)<L(2C)$ The resultant total inductance $L(1A)+L(2A)$ of the first and second horizontal compensation coils L1 and L2 for point A relative to the resultant total inductance $L(1C)+L(C)$ for point C becomes such that $L(1A)+L(2A)<L(1C)+L(2C)$.

This means that the resultant total impedance at points C is greater than that at point A, and thus the image size becomes smaller.

The change in the inductance at point B at the right end of the screen shown in FIG. 4 and also at points D located above and below point B is discussed below.

The first horizontal compensation coil L1 has an inductance $L(1B)$ at point B corresponding to the head of the crosshatched arrow B in FIG. 5, and thus the inductance $L(1B)$ at point B is equal to the inductance $L(1C)$ at points C.

On the other hand, the inductance $L(1D)$ at points D corresponds to the point obtained by shifting the head of the crosshatched arrow B to the left by an amount equal to the length of the solid arrow D. That is, the inductance $L(1D)$ corresponds to the head of the solid arrow D.

Therefore, as can be seen from FIG. 5, the inductance $L(1B)$ at point B relative to the inductance $L(1D)$ at points D becomes such that $L(1B)>L(1D)$.

In the case of the second horizontal compensation coil L2, the inductance L(2B) at point B corresponds to the point obtained by adding the crosshatched arrow B to the open arrow M (density of the bias magnetic flux generated by the pair of magnets 15 and 16). That is, the inductance L(2B) at point B corresponds to the head of the crosshatched arrow B.

On the other hand, the inductance L(2D) at points D corresponds to the point obtained by shifting the head of the crosshatched arrow B to the left by an amount equal to the length of the solid arrow D. That is, the inductance L(2D) at points D corresponds to the head of the solid arrow D.

Thus, the inductance L(2B) at point B relative to the inductance L(2D) at points D becomes such that L(2B)<L(2D).

If the inductances of the first and second horizontal compensation coils L1 and L2 are varied such that the resultant total inductance L(1B)+L(2B), at point B, of the first and second horizontal coils L1 and L2 relative to the resultant total inductance L(1D)+L(2D) at points D becomes such that L(1B)+L(2B)=L(1D)+L(2D), then the inductance at point D becomes equal to that at points D.

As a result, the image size becomes equal for point B and points D.

Thus, when the deflection is made upward or downward, the image size becomes smaller in the central area of the screen whereas the image size becomes constant at right and left ends of the screen. As a result, only the center pincushion distortion is compensated for and thus a high-quality image can be displayed on the screen.

The center pincushion compensating reactor used in the image distortion compensating apparatus according to the present invention includes two horizontal compensation coils connected to each other in series, one vertical compensation coil, and a pair of magnets for applying a bias magnetic field to the horizontal and vertical compensation coils.

Thus, the center pincushion compensating reactor includes a reduced number of compensation coils compared to the conventional center pincushion compensating reactor. This allows a reduction in cost. Furthermore, it becomes possible to realize a small-sized image distortion compensating apparatus with a simple structure which allows a high-quality image to be displayed.

Furthermore, because a current obtained by rectifying the vertical deflection current is used, the magnetic field includes a less amount of undesirable change and the coil exhibits less core singing noise.

Furthermore, because a smaller intensity of bias magnetic field is generated by the pair of magnets than generated by conventional magnets arranged such that the same types of poles face each other, the influence of the leakage magnetic field is minimized and thus the pair of magnets may be disposed without having to take the landing into account.

What is claimed:

1. An image distortion compensating apparatus including a center pincushion distortion compensating reactor, said center pincushion distortion compensating reactor including:

two horizontal compensation coils connected to each other in series;

one vertical compensation coil; and a pair of magnets for applying a bias magnetic field to said horizontal compensation coils and said vertical compensation coil, wherein a horizontal deflection current is passed through said two horizontal compensation coils, and wherein said vertical compensation coil is modulated with the period of a vertical deflection current such that a magnetic field is generated in a direction opposite to said bias magnetic field thereby changing the impedance of said horizontal compensation coils so as to compensate for a center pincushion distortion on the left and right side of a screen.

2. An image distortion compensating apparatus according to claim 1, wherein said two horizontal compensation coils are wound in directions such that the directions of magnetic fields generated by said two horizontal compensation coils become opposite to each other.

3. An image distortion compensating apparatus according to claim 1, wherein said vertical compensation coil is wound in a direction such that the direction of a magnetic field generated by said vertical compensation coil is opposite to the direction of said bias magnetic field.

4. An image distortion compensating apparatus according to claim 1, wherein the current applied to said two horizontal compensation coils is a current with a sawtooth waveform and the current applied to said vertical compensation coil is a current obtained by rectifying a current with a sawtooth waveform.

* * * * *